2005X
D. Harrington,
Bath.
Patented Oct. 4, 1813.
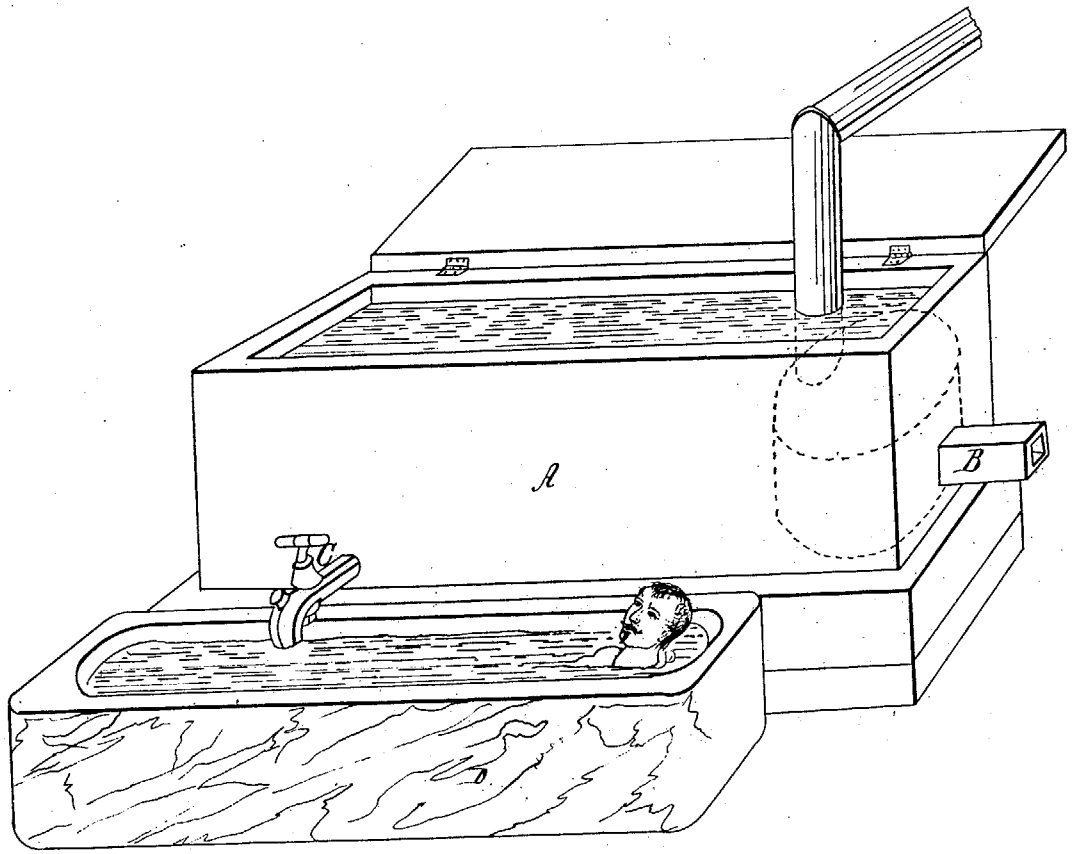
N. PETERS, PHOTO-LITHOGRAPHER, WASHINGTON, D.C.

Daniel Harrington 2005X 1

The Schedule referred to in these Letters Patent and mak-
ing part of the same containing a description in the words of the
said Daniel Harrington himself of his warm bathing vessel.
This warm bathing vessel is constructed with the bathing
and the heating parts in one vessel (so as to occupy but little
room) and be thereby better adapted to the use of families for
which it is well calculated as relates to its simplicity of
construction, cheapness, and the small quantity of fuel it
will require for its intended purpose. The heating and
bathing parts may be separate if required and may be a-
dapted to public bathing places as well as private, and
may have any number of baths for either. This bathing
vessel is constructed with or consists of a box or cistern which
may be made of wood or any material that will hold wa-
ter. its form may be square, oblong or any other shape so the
stove or furnace can be placed within it (it may be used
either with or without a top or lid) within this box or
cistern is placed a stove or furnace which may be made of
copper or iron or any substance that will keep the fire and
water apart. this stove or furnace is so fixed that the water
will surround it, or cover it on all its surface even its under
side excepting so much of one end as must necessarily
be left to receive in the fuel and admit air, to this part
of said end is attached a neck projecting from the end
or main body of the stove or furnace a few inches more or
less according to the size of the stove or furnace, the outer
end of which neck is nicely let through either the end or
side of the box or cistern which contain it and made wa-
ter proof by corking or wedging — through this said neck
the fuel is put into the stove or furnace which contains a
door to turn on hinges or be pushed in, either, which door
must join even with the end and main body of the said
stove

49

2005X

Stove or furnace, to prevent the fire from coming too near to the outer end of the neck which is to be put through the end or side of the box or cistern and which box or cistern if made of wood might otherwise take fire. On the top or side (near the opposite end) or at the end of said stove or furnace a pipe is attached and may take various directions within the box or cistern and convey the smoke out of the top, sides, bottom or any other part of said box &c. the pipe as well as the upper part of the stove or furnace will be immersed in water or not according to the quantity put into the box, &c The smoke may be conveyed from the said pipe into a chimney or through a wall or window out of the place where the bathing vessel stands. From the said box or cistern the warm or hot water is drawn through a cock at the end or sides, into one or more places attached to it (or apart from it) as may be, of a suitable form for a person to lay down at length or sit down and be in an easy posture. the best form is that of an oblong box sufficiently high in its sides & sufficiently wide & long to receive the person wishing to occupy it, so as he may be just immersed in the water excepting his head, but for the purpose of making as little water as possible to answer, the box may be made much narrower or at the end for the feet than that for the body, or it may be made rounding on its bottom, or it may be in an oblique form under where the neck and head would lay, and various other forms, The water is let out when done with through a hole by loosening a plug at the bottom. The aforementioned stove or furnace may be made in various forms so it has the neck of sufficient length attached to it as above described, and when said neck is attached to said stove or furnace it must be water tight as well as the whole of the stove or furnace (and pipe and also the neck excepting its outer end Witness Enoch [illegible] }
Jno. N. [illegible] }

Daniel Harrington

NH